US012631156B2

(12) United States Patent
Kamps et al.

(10) Patent No.: US 12,631,156 B2
(45) Date of Patent: May 19, 2026

(54) IGNITION DEVICE, METHOD FOR PRODUCING THE SAME, IGNITION METHOD AND ROCKET COMBUSTION SYSTEM

(71) Applicant: NATIONAL UNIVERSITY CORPORATION HOKKAIDO UNIVERSITY, Hokkaido (JP)

(72) Inventors: Landon Thomas Kamps, Sapporo (JP); Harunori Nagata, Sapporo (JP); Shota Hirai, Sapporo (JP); Yownin Albert Leung, Sapporo (JP); Yuki Nobuhara, Sapporo (JP)

(73) Assignee: NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 18/621,655

(22) Filed: Mar. 29, 2024

(65) Prior Publication Data

US 2024/0263600 A1 Aug. 8, 2024

Related U.S. Application Data

(63) Continuation of application No. PCT/JP2022/039149, filed on Oct. 20, 2022.

(30) Foreign Application Priority Data

Oct. 25, 2021 (JP) ................................. 2021-173955

(51) Int. Cl.
F02K 9/95 (2006.01)
B64G 1/40 (2006.01)
F02K 9/08 (2006.01)

(52) U.S. Cl.
CPC .................. F02K 9/95 (2013.01); B64G 1/40 (2013.01); F02K 9/08 (2013.01); F05D 2260/99 (2013.01)

(58) Field of Classification Search
CPC ... B64G 1/404; F02K 9/08; F02K 9/72; F02K 9/95
See application file for complete search history.

(56) References Cited

U.S. PATENT DOCUMENTS

| | | | |
|---|---|---|---|
| 6,684,624 B2 * | 2/2004 | Karabeyoglu | F02K 9/72 |
| | | | 60/251 |
| 9,429,104 B2 * | 8/2016 | Fuller | B64G 1/404 |
| 10,259,756 B2 * | 4/2019 | Danforth | F02K 9/95 |

FOREIGN PATENT DOCUMENTS

JP       H5-296697 A       11/1993

OTHER PUBLICATIONS

Whitmore, Stephen A., Development of a Power-Efficient, Restart-Capable Arc Ignitor for Hybrid Rockets, 2015, Journal of Propulsion and Power vol. 31, No. 6 (Year: 2015).*

(Continued)

*Primary Examiner* — Kyle Robert Thomas
(74) *Attorney, Agent, or Firm* — Morgan, Lewis & Bockius LLP

(57) ABSTRACT

The present disclosure is directed to an ignition device including a housing, a bulk fuel, and at least two lead wires as electrodes. The bulk fuel is made of a plastic material, such as polylactic acid (PLA) or epoxy resin. The bulk fuel contains an internally dispersed powdery conductive material, thereby obtaining a conductive solid fuel. One end of the lead wire is partially embedded in the bulk fuel. The other end of the lead wire is connected to a power source. A (Continued)

portion of the bulk fuel is gasified by energizing the lead wire, and the gasified fuel is combusted by reaction with an oxidant.

15 Claims, 24 Drawing Sheets

(56) References Cited

OTHER PUBLICATIONS

Hirai et al., "Development of safe, low-cost, re-ignitable rocket ignition system," 2021 AIAA Propulsion and Energy forum (2021).
Mechentel et al., "Small-scale Gaseous Oxygen Hybrid Rocket Testing for Regression Rate and Combustion Efficiency Studies," 53rd AIAA/SAE/ASEE Joint Propulsion Conference (2017).
Dyrda et al., "Diode Laser Ignition of a Poly(Methyl Methacrylate) and Gaseous Oxygen Hybrid Motor," Journal of Propulsion and Power, 36(5) (2020).
Whitmore et al., "Development of a Power-Efficient, Restart-Capable Arc Ignitor for Hybrid Rockets," Journal of Propulsion and Power, 31(6) (2015).
International Search Report issued in corresponding International Patent Application No. PCT/JP2022/039149 dated Dec. 20, 2022.
International Preliminary Report on Patentability issued in corresponding International Patent Application No. PCT/JP2022/039149 dated Oct. 10, 2023.

* cited by examiner

Fig. 18A
Fig. 18B
Fig. 19A
Fig. 19B
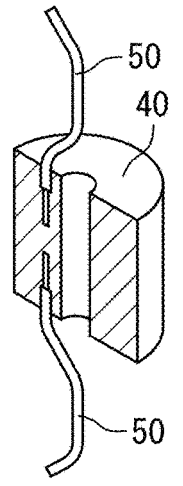
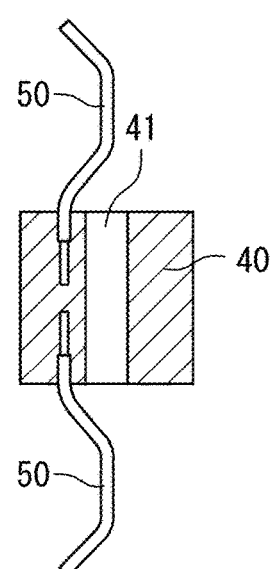

Fig. 20A
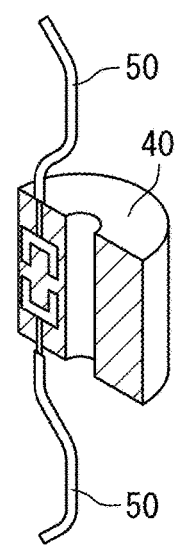
Fig. 20B
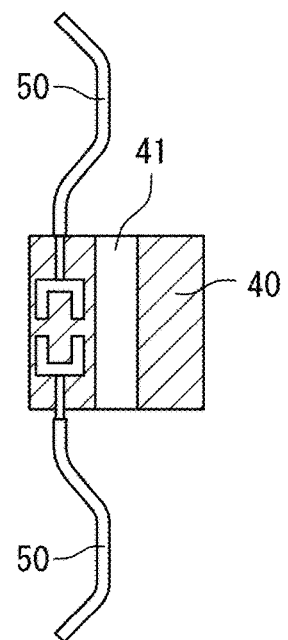
Fig. 21A
Fig. 21B
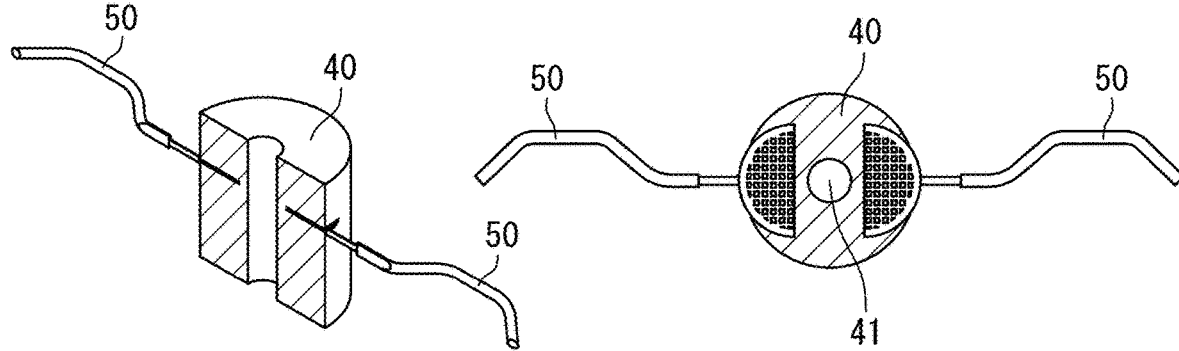

IGNITION DEVICE, METHOD FOR PRODUCING THE SAME, IGNITION METHOD AND ROCKET COMBUSTION SYSTEM

CROSS-REFERENCE TO RELATED APPLICATIONS

This application is a continuation of International Patent Application No. PCT/JP2022/039149, filed on Oct. 20, 2022, which claims the benefit of Japanese Patent Application No. 2021-173955, filed on Oct. 25, 2021, the contents all of which are incorporated herein by reference.

TECHNICAL FIELD

The present invention relates to, for example, a conductive solid fuel for igniting liquid fuel of a liquid rocket, solid fuel of a solid rocket, solid fuel of a hybrid rocket motor, wood, charcoal, combustible gas, or the like, also an ignition device, a method for producing the same, and an ignition method. The present invention also relates to, for example, a rocket combustion system for igniting liquid fuel of a liquid rocket, solid fuel of a solid rocket motor, and solid fuel of a hybrid rocket motor, mounted on a space rocket, an artificial satellite, a flying object, or the like.

BACKGROUND ART

In cosmic space, a "kick motor (thruster)" for a satellite used for a purpose such as orbit conversion to an orbit having no intersection (e.g., Hohmann transfer), injection into another celestial body orbit, or landing on a gravitational celestial body is required to have re-ignitability.

Hybrid rockets are capable of "re-ignition", which is not possible in solid propellant systems, and in order to take advantage of this, several re-ignition devices have been developed in the world. In Non-patent Document 1 below, re-ignition is attempted by a simple ignition method in which fuel is gasified by a heating element and mixed with an oxidant and thereby the fuel is ignited. However, energy efficiency is not so high, and it is necessary to apply power of about 100 W to 200 W for 15 seconds or more in order to gasify the fuel.

Non-patent Document 2 proposes a method of igniting a mixed gas of gas oxygen and methane gas by using a spark plug. This enables reliable re-ignition in which an amount of heat can be controlled, but safety of a hybrid rocket is impaired by using methane. In addition, it is necessary to separately prepare a supply system for methane, which increases weight and volume of an igniter relative to an entire rocket system.

In Non-patent Document 3, an ignition device using a diode laser has been developed for the purpose of developing a re-ignition device applicable to any combination of propellants. Re-ignition was successful at a power of 10.84 W under atmospheric pressure conditions and 12 W under low pressure conditions. However, an ignition device using a diode laser requires a copper heat sink for absorbing heat, a lens for preventing scattering of laser light, and ABS fuel for accelerating ignition, which complicates the structure and increases weight and cost. Furthermore, the ignition using the laser is too local to freely determine the position of the igniter.

According to Non-patent Document 4, it was found in 2015 that arc discharge occurs by applying an ultra-high voltage to ABS fuel, and re-ignition was successful at a power of about 4 W under atmospheric pressure conditions. However, this ignition method requires an ultra-high voltage of several hundred V to several thousand V, and a voltage amplifier for this purpose is required. Although this is an excellent ignition method in terms of thermal efficiency, not only an electric system becomes complicated, but also weight and volume of the electric system relative to an entire rocket system increase.

In consideration of an optimal rocket system, it is important to minimize a weight ratio of an ignition device to an entire system as much as possible. In particular, there is a need for a re-ignition device that is safe, low in cost, small in size, and light in weight, yet capable of igniting in a short time, without impairing safety of a hybrid rocket, but there is no re-ignition device that satisfies these requirements in the world.

PRIOR ART

[Non-patent Document 1] S. Hirai, K. Landon, H. Nagata, "Development of safe, low-cost, re-ignitable rocket ignition system", 2021 AIAA Propulsion and Energy forum, 2021.

[Non-patent Document 2] Flora S. Mechentel and Brian J. Cantwell, "Small-scale Gaseous Oxygen Hybrid Rocket Testing for Regression Rate and Combustion Efficiency Studies", 53rd AIAA/SAE/ASEE Joint Propulsion Conference, 2017. [Non-patent Document 3] David M. Dyrda, Flora S. Mechentel, Brian J. Cantwell, Ashley C. Karp, Jason Rabinovitch and Elizabeth T. Jens, "Diode Laser Ignition of a Poly(methyl methacrylate) and Gaseous Oxygen Hybrid Motor", JOURNAL OF PROPULSION AND POWER, Volume 36, Number 5, 2020.

[Non-patent Document 4] Stephen A. Whitmore, Nathan R. Inkley, Daniel P. Merkley and Michael I. Judson, "Development of a Power-Efficient, Restart-Capable Arc Ignitor for Hybrid Rockets", JOURNAL OF PROPULSION AND POWER, Volume 31, Number 6, 2015.

SUMMARY OF THE INVENTION

An object of the present invention is to provide a conductive solid fuel, an ignition device using the same, a method for producing the same, and an ignition method, resulting in a simple structure and excellent re-ignition performance, safety management, thermal management, and reliability. Another object of the present invention is to provide a rocket combustion system including such an ignition device.

A first aspect of the present invention is directed to a conductive solid fuel that is gasified by energization and ignited by a reaction with an oxidant, the conductive solid fuel including:

a bulk fuel made of a plastic material; and a powdery conductive substance dispersed in the bulk fuel.

An ignition device according to a second aspect of the present invention includes:

the above-described conductive solid fuel; and an electrode partially embedded in the bulk fuel.

An ignition method according to a third aspect of the present invention includes steps of:

gasifying a part of the above-described bulk fuel by using heat generated by energization of the electrode; and supplying an oxidant to combust the gasified bulk fuel.

A rocket combustion system according to a fourth aspect of the present invention includes:

an oxidant line for feeding an oxidant;

a flow rate valve for controlling a flow rate of the oxidant flowing through the oxidant line;

a casing having an internal space to which the oxidant line is connected;

a main fuel stored in the internal space;

a nozzle for discharging a combustion gas generated by a reaction between the main fuel and the oxidant; and the above-described ignition device provided between the oxidant line and the internal space to ignite the main fuel.

A method for producing an ignition device according to a fifth aspect of the present invention includes steps of:

softening the above-described conductive solid fuel by heating;

press-fitting and partially embedding an electrode into the softened conductive solid fuel; and fixing the electrode by curing the conductive solid fuel.

According to the present invention, ignition that is excellent in re-ignition performance, safety management, thermal management, and reliability is realized with a simple structure. According to the rocket combustion system according to the present invention, stable re-ignition operation can be realized even in space.

BRIEF DESCRIPTION OF THE DRAWINGS

FIG. 18A is a perspective one-side cross-sectional view illustrating an example of various modes in which the lead wire is embedded, and FIG. 18B is a cross-sectional view illustrating the mode viewed from a side thereof.

FIG. 19A is a perspective one-side cross-sectional view illustrating an example of various modes in which the lead wire is embedded, and FIG. 19B is a cross-sectional view illustrating the mode viewed from a side thereof.

FIG. 20A is a perspective one-side cross-sectional view illustrating an example of various modes in which the lead wire is embedded, and FIG. 20B is a cross-sectional view illustrating the mode viewed from a side thereof.

FIG. 21A is a perspective one-side cross-sectional view illustrating an example of various modes in which the lead wire is embedded, and FIG. 21B is a cross-sectional view illustrating the mode viewed from above.

DETAILED DESCRIPTION

Figure 1:
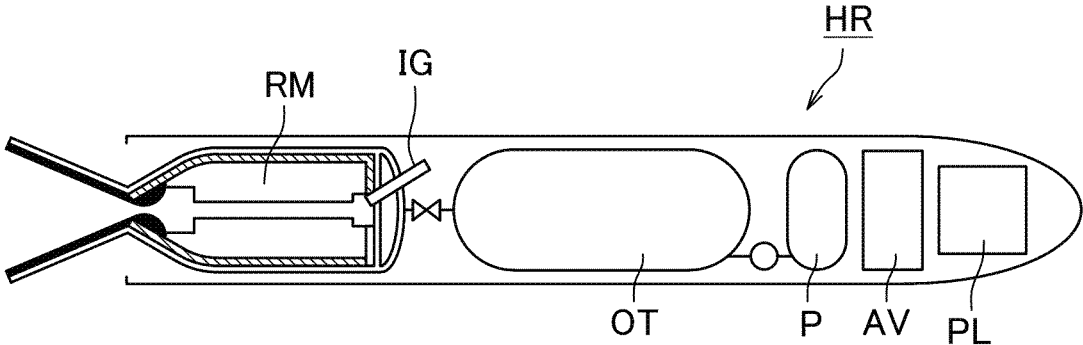
FIG. 1 is a configuration diagram illustrating an example of a hybrid rocket to which the present invention can be applied.

FIG. 1 is a configuration diagram illustrating an example of a hybrid rocket to which the present invention can be applied. A hybrid rocket HR includes a rocket motor RM in which a main solid fuel is mounted, an oxidant tank OT that stores an oxidant to be supplied to the rocket motor RM, a pressurizing pump P that supplies a pressure to the oxidant tank, an ignition device IG that ignites the main solid fuel, a payload PL such as a cargo, an occupant, or an experimental device, and an avionics AV including an electronic device that controls flight. The present invention can be applied to not only ignition of solid fuel of a hybrid rocket motor but also ignition of liquid fuel of a liquid rocket, solid fuel of a solid rocket, wood, charcoal, combustible gas, and the like.

Figure 2:
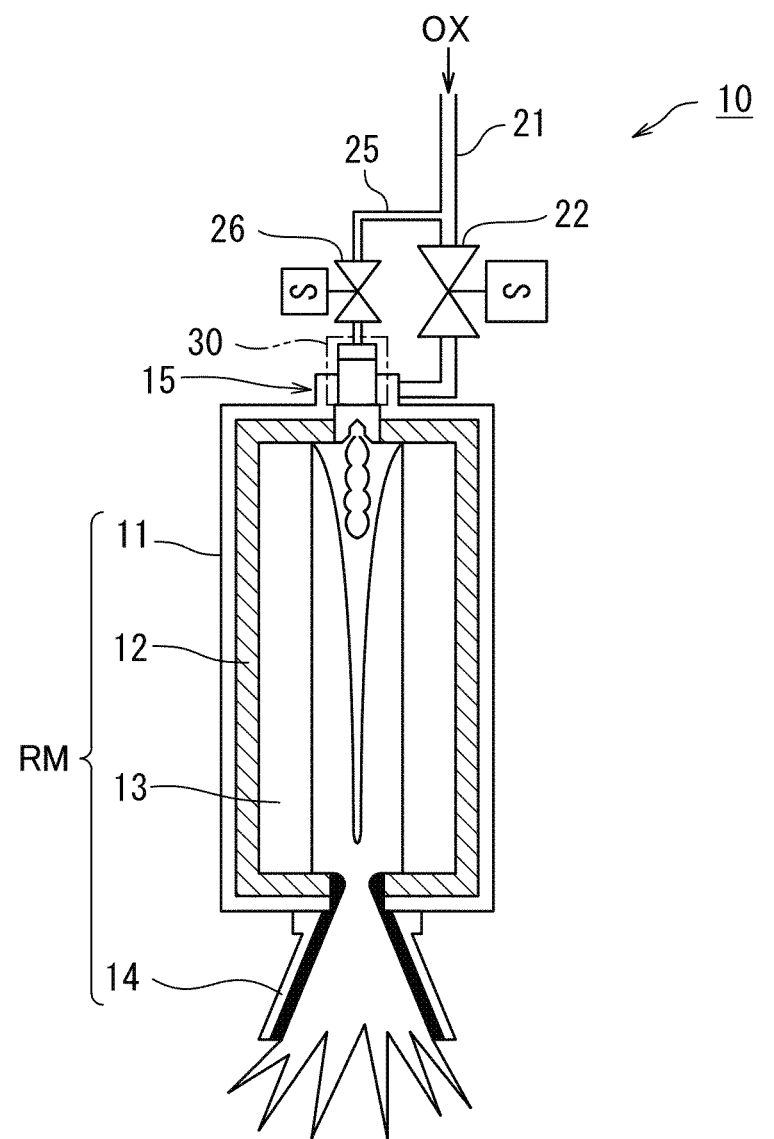
FIG. 2 is a configuration diagram illustrating an example of a hybrid rocket combustion system according to the present invention.
Figure 3:
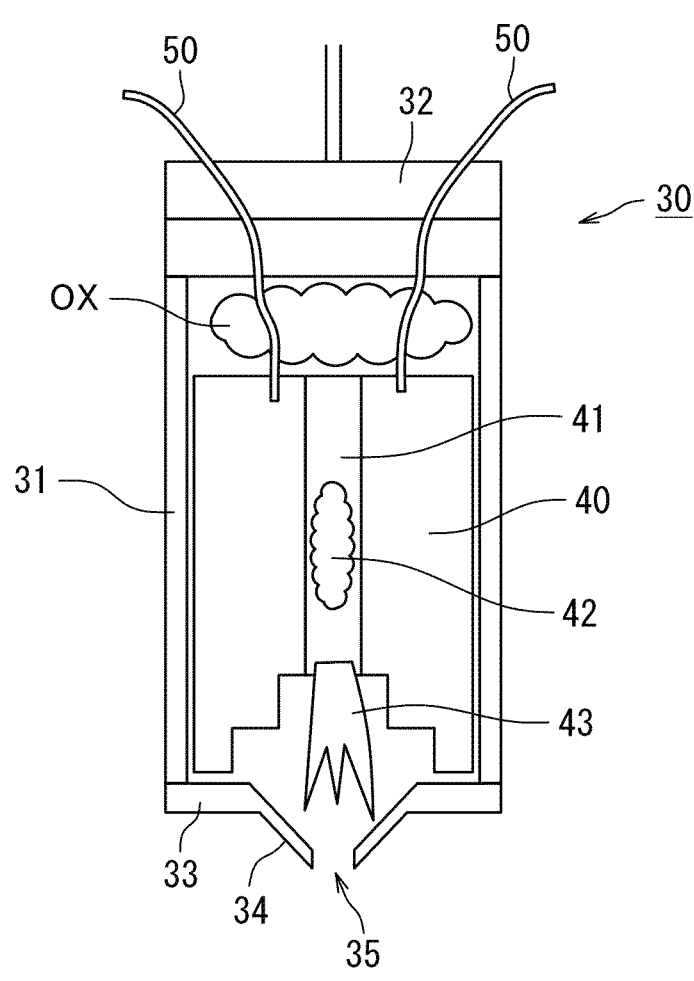
FIG. 3 is a configuration diagram illustrating an example of an ignition device according to the present invention.

FIG. 2 is a configuration diagram illustrating an example of a hybrid rocket combustion system 10 according to the present invention. FIG. 3 is a configuration diagram illustrating an example of an ignition device 30 according to the present invention. With reference to FIGS. 2 and 3, the hybrid rocket combustion system 10 includes an oxidant supply pipeline and the rocket motor RM in which the main solid fuel is mounted, as a whole.

The oxidant supply pipeline includes, for example, a main line 21, a main valve 22, a bypass line 25, a bypass valve 26, the ignition device 30 illustrated in FIG. 3, and a manifold 15. The main line 21 feeds an oxidant OX stored in the oxidant tank OT. Examples of the oxidant OX include oxygen, hydrogen peroxide, nitric acid, nitrous oxide, dinitrogen tetroxide, ammonium perchlorate, ammonium nitrate, nitroglycerin, and nitrocellulose.

The main valve 22 controls a flow rate of the oxidant OX flowing through the main line 21 in accordance with a command from a controller (not illustrated). The oxidant OX whose flow rate is controlled by the main valve 22 is fed to the manifold 15.

The bypass line 25 is connected to a middle of the main line 21 and splits the oxidant OX flowing through the main line 21 so that a part of the oxidant OX flows through the bypass line 25. The bypass valve 26 controls a flow rate of the oxidant OX flowing through the bypass line in accordance with a command from the controller. The oxidant OX whose flow rate is controlled by the bypass valve 26 is fed to an ignition device 30 incorporated in the manifold 15. A combustion gas generated by the ignition device 30 is directly fed to an internal space of the rocket motor RM.

The rocket motor RM includes, for example, a casing 11, a heat insulator 12, a main solid fuel 13, and a nozzle 14.

The casing 11 has a columnar internal space and is connected to be in fluid communication with the manifold 15. The heat insulator 12 is provided over an entire inner wall of the casing 11 or is provided on a part of the inner wall, and has a function of suppressing transmission of heat generated in the internal space to the casing 11. The main solid fuel 13 is stored in the internal space and is, for example, made of a material selected from the group consisting of polyethylene, polyester, polyurethane, polyacrylonitrile, and polymethyl methacrylate (PMMA).

Next, with reference to FIG. 3, The ignition device 30 includes, for example, a housing 31, a bulk fuel 40, at least two lead wires 50 as electrodes, and an input port. The housing 31 has a columnar internal space and is connected to be in fluid communication with the input port. The input port is connected to the bypass valve 26 illustrated in FIG. 1. A bottom face 33 of the housing 31 is provided with a bulging portion 34 having a small-diameter outlet 35. This allows a pressure of combustion gas to efficiently gather toward the outlet 35 of the bulging portion 34. A top face of the housing 31 is provided with a flange 32.

The bulk fuel 40 is stored in the internal space and is, for example, made of a material selected from the group consisting of polylactic acid (PLA), epoxy resin, polyethylene, polyester, polyurethane, polyacrylonitrile, polymethyl methacrylate (PMMA), acrylonitrile-butadiene-styrene resin (ABS resin), and polyethylene terephthalate. The bulk fuel 40 preferably has a columnar outer shape, similar to the internal space, and has at least one through hole 41 extending parallel to a longitudinal direction of the column. The through hole 41 may be provided at only one position along a center of the bulk fuel 40 and/or may be provided at a plurality of predetermined radial positions around the center of the bulk fuel 40. The through hole 41 may be coaxial or may be non-coaxial with the center of the bulk fuel 40. Due to the presence of the through hole 41, combustion can proceed stably in the axial direction.

The bulk fuel 40 contains an internally dispersed powdery conductive substance, and thereby conductive solid fuel is obtained. Such a conductive substance is, for example, made of a material selected from the group consisting of graphite, carbon black, metal, semiconductor, graphene, carbon fiber, and carbon nanotube. Due to the dispersion of the conductive material, the bulk fuel 40 can have a predetermined volume resistivity. The volume resistivity of the bulk fuel 40 is preferably in a range of 0.763 [Ω·cm] to 10,000,000 [Ω·cm]. In a case where the volume resistivity falls below the lower limit, a resistance value of the bulk fuel 40 becomes too small, thereby requiring a low-voltage large-current power supply. In a case where the volume resistivity exceeds the upper limit, the resistance value of the bulk fuel 40 becomes too large, thereby requiring a high-voltage power supply or making it necessary to reduce a distance of the lead wires 50.

The lead wires 50 are electrically connected to the bulk fuel 40 by passing through the flange 32. One end of each of the lead wires 50 is partially embedded in the bulk fuel 40. The other end of each of the lead wires 50 is connected to a power supply (not illustrated). When an electric power is supplied from the power supply in accordance with a command from the controller (not illustrated), an electric current flows along a path in this order of a leading end of the first lead wire 50, the bulk fuel 40, and a leading end of the second lead wire 50, and then the bulk fuel 40 is heated and vaporized by Joule heat to generate a gasified fuel 42 in the through hole 41.

The gasified fuel 42 chemically reacts with the oxidant ox to generate a combustion gas 43, which is discharged through the outlet 35 to the outside. This can ignite the main solid fuel 13 of the rocket motor RM. The input port, the through hole 41, and the outlet 35 are preferably positioned coaxially along a predetermined reference line. This enables rotationally symmetric or asymmetric combustion around the reference line in the internal space of the housing 31.

Figure 4:
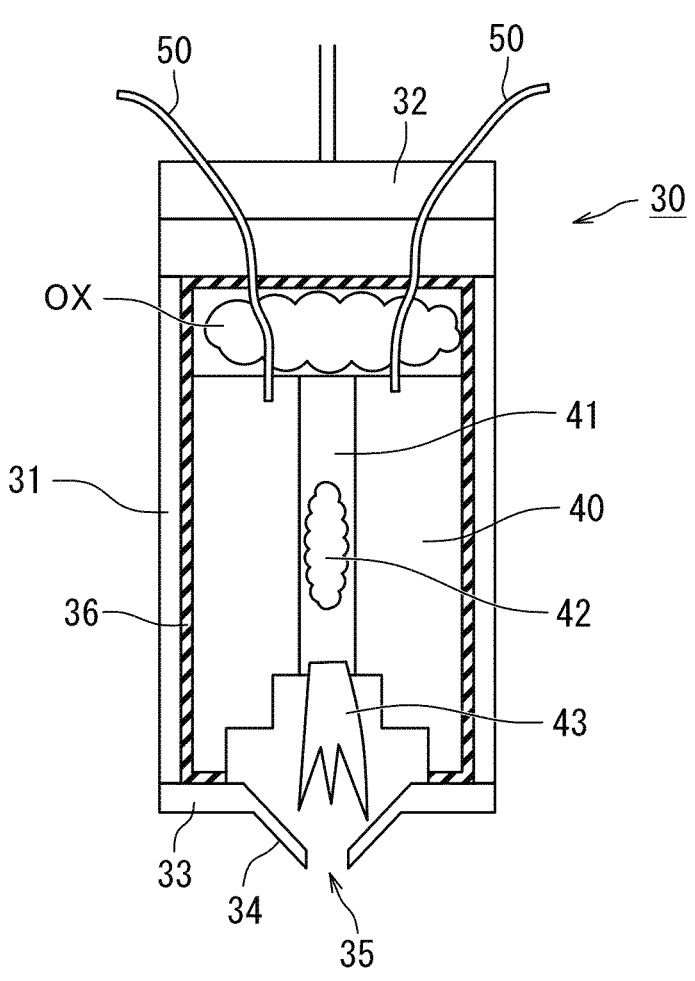
FIG. 4 is a configuration diagram illustrating another example of the ignition device according to the present invention.

FIG. 4 is a configuration diagram illustrating another example of the ignition device 30 according to the present invention. This ignition device 30 is similar to the configuration of FIG. 3, but an electrically insulating layer 36 made of such as synthetic resin is provided on the inner surface of the housing 31. This makes it possible to keep an electric current flowing between the lead wires 50 from leaking to the housing 31 in a case where the housing 31 is formed of a conductive material such as metal, thereby improving heating efficiency of the bulk fuel 40.

Next, an example of a method for producing the ignition device 30 described above is described below. First, the bulk fuel 40 containing the powdery conductive substance as described above is softened by heating. As a heating method, for example, 1) a method of electrically heating the bulk fuel 40 while applying a minute electric power to the bulk fuel 40, 2) a method of heating the bulk fuel 40 by using an external heater or a heating furnace, or the like can be adopted. Next, electrodes such as lead wires are press-fitted and partially embedded in the softened bulk fuel 40. The electrodes are then fixed by curing the bulk fuel 40 by natural or forced cooling. The bulk fuel 40 and the electrodes can be connected by such a simple method.

Figure 5:
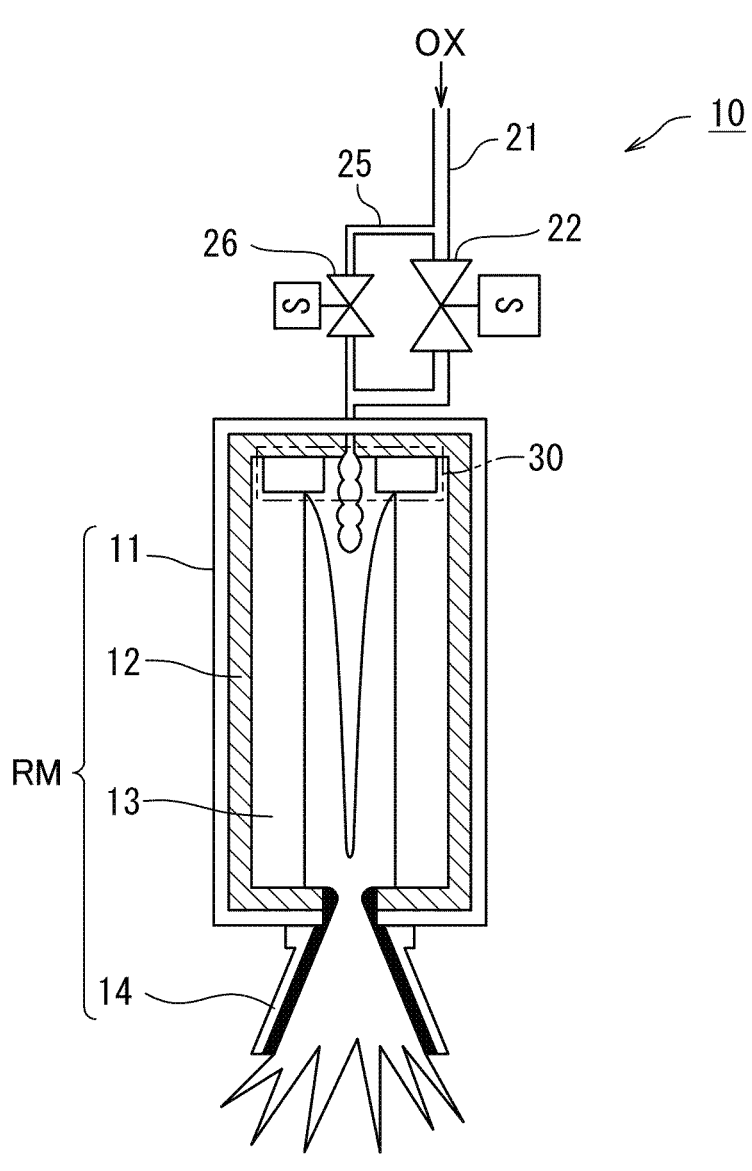
FIG. 5 is a configuration diagram illustrating another example of a hybrid rocket to which the present invention can be applied.
Figure 6:
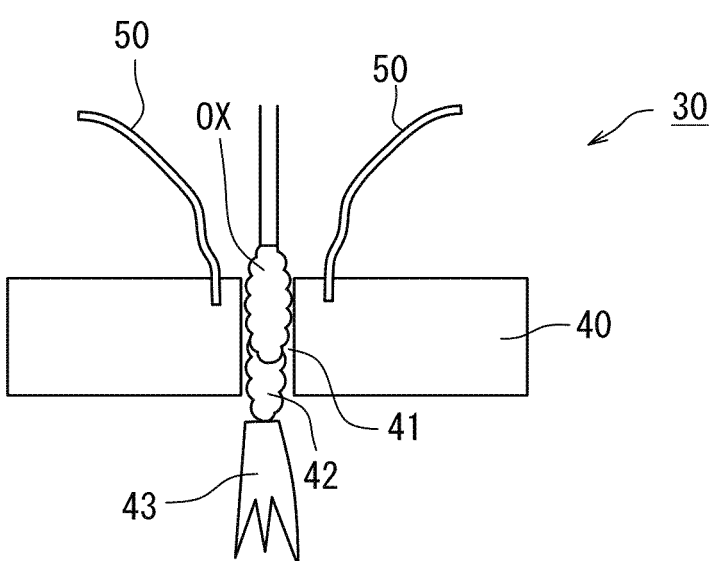
FIG. 6 is a configuration diagram illustrating still another example of the ignition device according to the present invention.
Figure 7A:
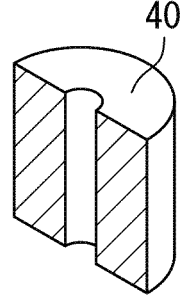
FIG. 7A is a perspective one-side cross-sectional view illustrating an example of various shapes of bulk fuel.
Figure 7B:
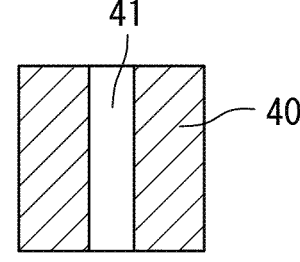
FIG. 7B is a cross-sectional view illustrating the shape viewed from a side thereof.
Figure 8A:
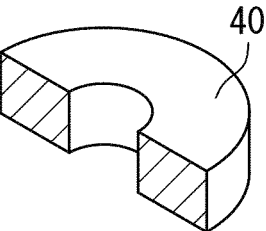
FIG. 8A is a perspective one-side cross-sectional view illustrating an example of various shapes of bulk fuel.
Figure 8B:
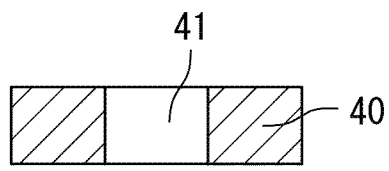
FIG. 8B is a cross-sectional view illustrating the shape viewed from a side thereof.
Figure 9A:
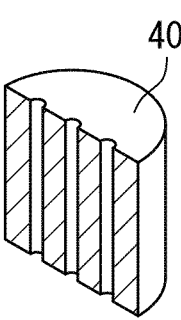
FIG. 9A is a perspective one-side cross-sectional view illustrating an example of various shapes of bulk fuel.
Figure 9B:
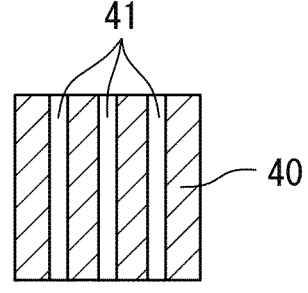
FIG. 9B is a cross-sectional view illustrating the shape viewed from a side thereof.

FIG. 5 is a configuration diagram illustrating another example of a hybrid rocket to which the present invention can be applied. FIG. 6 is a configuration diagram illustrating still another example of the ignition device 30 according to the present invention. This hybrid rocket HR has a configuration similar to that illustrated in FIG. 2, but the ignition device 30 is installed in an internal space of the rocket motor RM.

With reference to FIG. 6, the ignition device 30 includes such a bulk fuel 40 and at least two lead wires 50, in which members such as a housing are omitted. The bulk fuel 40 has a columnar outer shape, similar to the internal space of the casing 11, and has at least one through hole 41 extending parallel to a longitudinal direction of the column. The bulk fuel 40 contains an internally dispersed powdery conductive material, similar to that of FIG. 3.

The lead wires 50 are electrically connected to the bulk fuel 40 by passing through the casing 11. One end of each of the lead wires 50 is partially embedded in the bulk fuel 40. The other end of each of the lead wires 50 is connected to a power supply (not illustrated). When an electric power is supplied from the power supply in accordance with a command from the controller (not illustrated), an electric current flows along a path in this order of a leading end of the first lead wire 50, the bulk fuel 40, and a leading end of the second lead wire 50, and then the bulk fuel 40 is heated and vaporized by Joule heat to generate a gasified fuel 42 in the through hole 41.

The gasified fuel 42 chemically reacts with the oxidant ox to generate a combustion gas 43, which is discharged toward the main solid fuel 13 of the rocket motor RM. This can ignite the main solid fuel 13.

Usage of the conductive solid fuel as described above can achieve ignition that is excellent in re-ignition performance, safety management, thermal management, and reliability by means of a simple structure.

FIGS. 7A to 13A are perspective one-side cross-sectional views illustrating examples of various shapes of the bulk fuel 40, and FIGS. 7B to 13B are cross-sectional views illustrating the shapes viewed from sides thereof. The bulk fuel 40 illustrated in FIG. 7 has a columnar outer shape, and has a cylindrical through hole 41 at a center thereof. The bulk fuel 40 illustrated in FIG. 8 has a columnar outer shape flatter than that of FIG. 7, and has a cylindrical through hole 41 at a center thereof. The bulk fuel 40 illustrated in FIG. 9 has a columnar outer shape similar to that of FIG. 7, and has three through holes 41 at a center thereof and at positions away from the center by substantially half the radius.

Figure 10A:
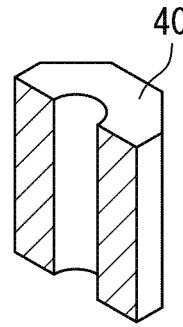
FIG. 10A is a perspective one-side cross-sectional view illustrating an example of various shapes of bulk fuel.
Figure 10B:
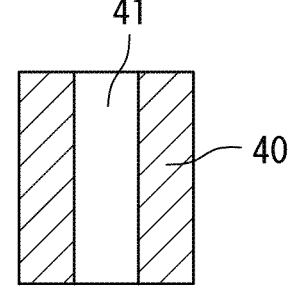
FIG. 10B is a cross-sectional view illustrating the shape viewed from a side thereof.
Figure 11A:
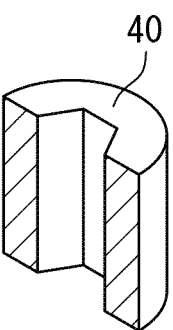
FIG. 11A is a perspective one-side cross-sectional view illustrating an example of various shapes of bulk fuel.
Figure 11B:
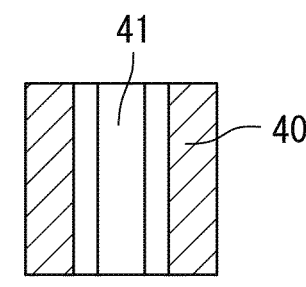
FIG. 11B is a cross-sectional view illustrating the shape viewed from a side thereof.
Figure 12A:
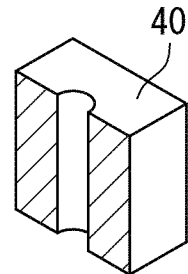
FIG. 12A is a perspective one-side cross-sectional view illustrating an example of various shapes of bulk fuel.
Figure 12B:
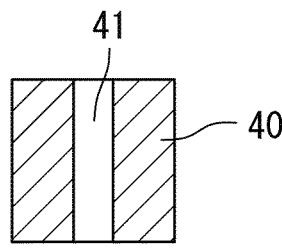
FIG. 12B is a cross-sectional view illustrating the shape viewed from a side thereof.
Figure 13A:
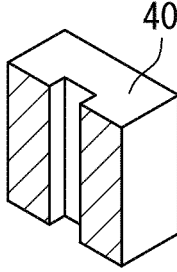
FIG. 13A is a perspective one-side cross-sectional view illustrating an example of various shapes of bulk fuel.
Figure 13B:
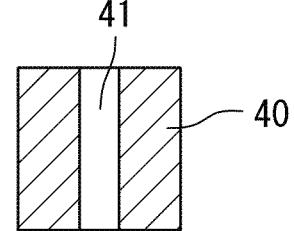
FIG. 13B is a cross-sectional view illustrating the shape viewed from a side thereof.

The bulk fuel 40 illustrated in FIG. 10 has a prismatic outer shape having a regular octagonal cross section, and has a cylindrical through hole 41 at a center thereof. The bulk fuel 40 illustrated in FIG. 11 has a cylindrical outer shape, and has a prismatic through hole 41 having a regular hexagonal cross section at a center thereof. The bulk fuel 40 illustrated in FIG. 12 has a prismatic outer shape having a square cross section, and has a cylindrical through hole 41 at a center thereof. The bulk fuel 40 illustrated in FIG. 13 has a prismatic outer shape having a square cross section, and has a prismatic through hole 41 having a square cross section at a center thereof.

FIGS. 14A to 14D are perspective views illustrating examples of various shapes of the lead wire 50. The lead wire 50 includes a conductive wire 51 made of copper, aluminum, or the like, and an electrical insulating film 52 covering a portion of the lead wire except for the leading end, and an electrode terminal 53 is connected as necessary. The lead wire 50 illustrated in FIG. 14A does not include the electrode terminal 53, and the conductive wire 51 is embedded in the bulk fuel 40 without the electrode terminal 53. The lead wire 50 illustrated in FIG. 14B includes the electrode terminal 53 having a shape of a two-pronged fork, and the electrode terminal 53 is embedded in the bulk fuel 40 together with the conductive wire 51. The lead wire 50 illustrated in FIG. 14C has the electrode terminal 53 having a shape of a six-pronged fork, and the electrode terminal 53 is embedded in the bulk fuel 40 together with the conductive wire 51. The lead wire 50 illustrated in FIG. 14D has the electrode terminal 53 having a mesh shape, and the electrode terminal 53 is embedded in the bulk fuel 40 together with the conductive wire 51. A contact area between the lead wire 50 and the bulk fuel 40 can be controlled according to the shape and size of the electrode terminal 53.

Figure 14A:
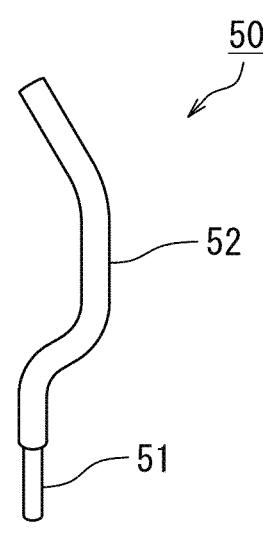
FIGS. 14A to 14D are perspective views illustrating examples of various shapes of a lead wire.
Figure 14B:
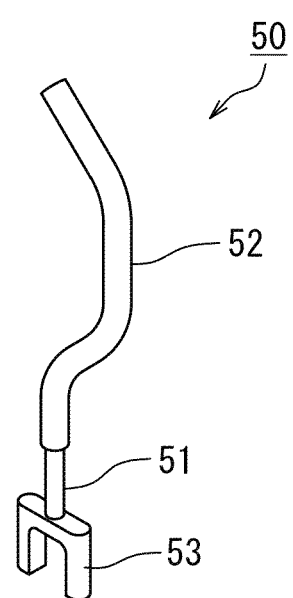
Figure 14C:
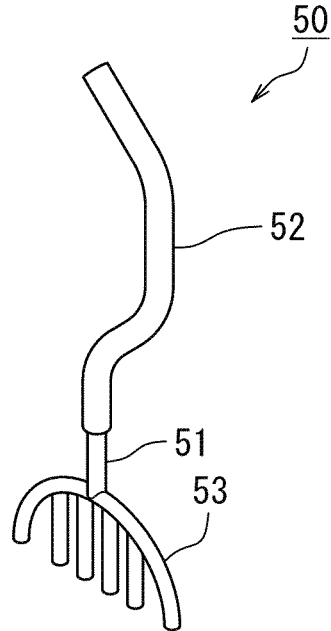
Figure 14D:
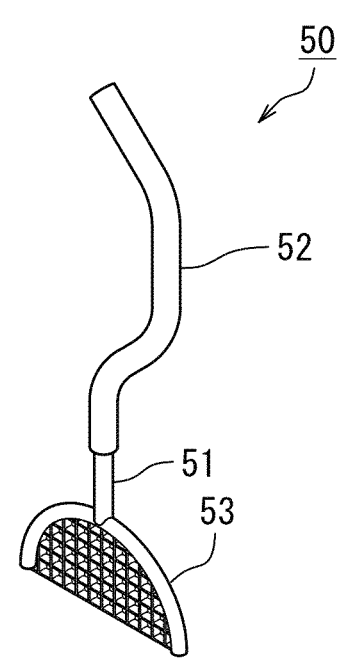
Figure 15A:
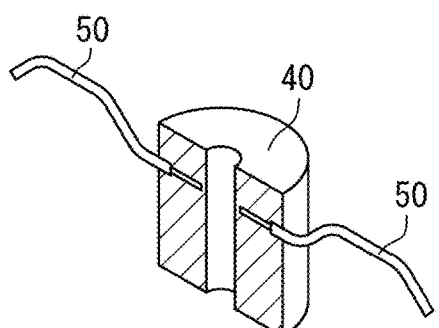
FIG. 15A is a perspective one-side cross-sectional view illustrating an example of various modes in which the lead wire is embedded.
Figure 15B:
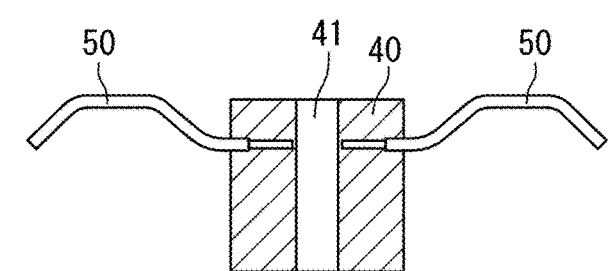
FIG. 15B is a cross-sectional view illustrating the mode viewed from a side thereof.
Figure 16A:
FIG. 16A is a perspective one-side cross-sectional view illustrating an example of various modes in which the lead wire is embedded.
Figure 16B:
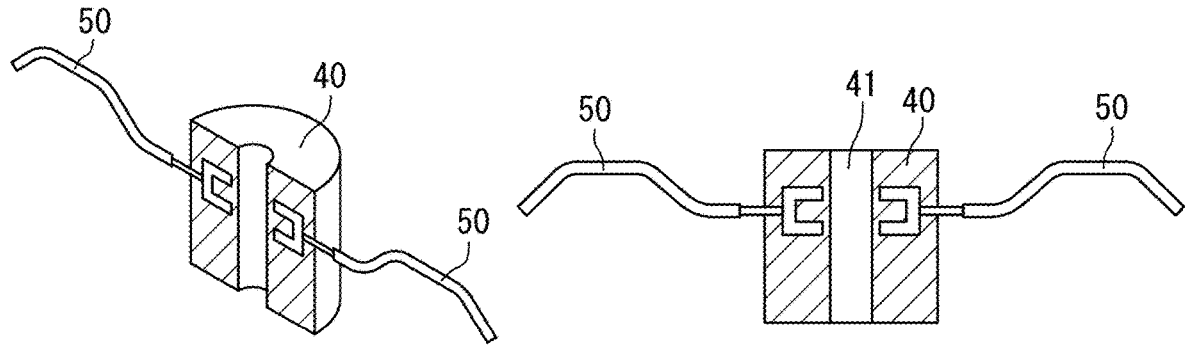
FIG. 16B is a cross-sectional view illustrating the mode viewed from a side thereof.
Figure 17A:
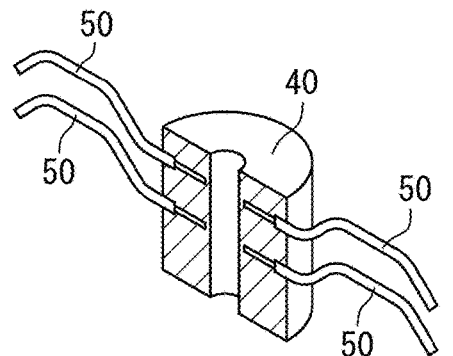
FIG. 17A is a perspective one-side cross-sectional view illustrating an example of various modes in which the lead wire is embedded.
Figure 17B:
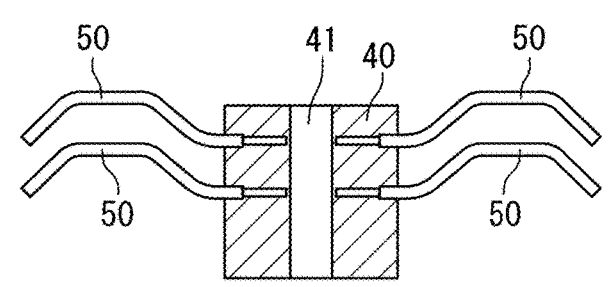
FIG. 17B is a cross-sectional view illustrating the mode viewed from a side thereof.
Figures 22A, 22B:
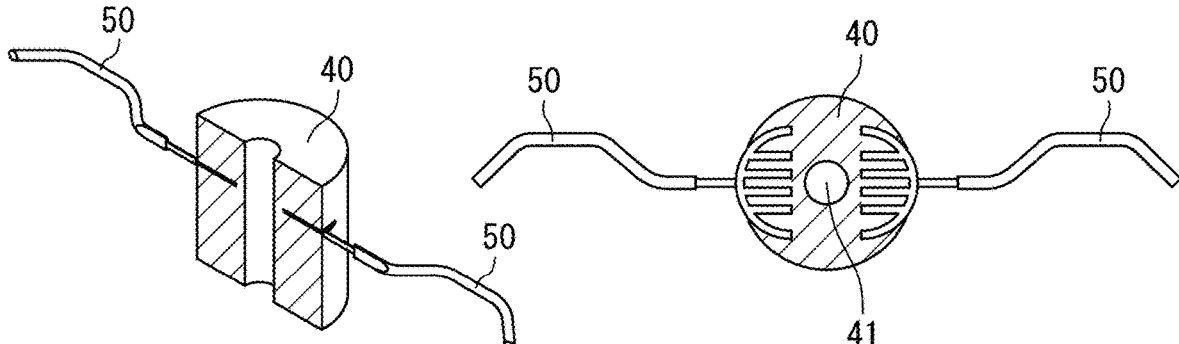
FIG. 22A is a perspective one-side cross-sectional view illustrating an example of various modes in which the lead wire is embedded.
FIG. 22B is a cross-sectional view illustrating the mode viewed from above.

FIGS. 15A to 22A are perspective one-side cross-sectional views illustrating examples of various modes in which the lead wire 50 is embedded, FIGS. 15B to 20B are cross-sectional views illustrating the modes viewed from sides, and FIGS. 21B to 22B are cross-sectional views illustrating the modes viewed from above. Although use of the columnar bulk fuel 40 illustrated in FIG. 7 is illustrated here, the bulk fuel 40 illustrated in FIGS. 8 to 13 can also be used. In the bulk fuel 40 illustrated in FIGS. 15A and 15B, leading ends of the conductive wires 51 illustrated in FIG. 14A face each other so as to sandwich the through hole 41 from right and left sides. In the bulk fuel 40 illustrated in FIGS. 16A and 16B, leading ends of the electrode terminals 53 illustrated in FIG. 14B face each other so as to sandwich the through hole 41 from right and left sides. In the bulk fuel 40 illustrated in FIGS. 17A and 17B, two lead wires 50 illustrated in FIG. 14A are inserted from each of the left and right sides, and leading ends of the conductive wires 51 face each other so as to sandwich the through hole 41 from the right and left sides. In the bulk fuel 40 illustrated in FIGS. 18A and 18B, two lead wires 50 illustrated in FIG. 14B are inserted from each of the left and right sides, and leading ends of the electrode terminals 53 face each other so as to sandwich the through hole 41 from the right and left sides.

In the bulk fuel 40 illustrated in FIGS. 19A and 19B, the leading ends of the conductive wires 51 illustrated in FIG. 14A are inserted from upper and lower sides and face each other beside the through hole 41. In the bulk fuel 40 illustrated in FIGS. 20A and 20B, the leading ends of the electrode terminals 53 illustrated in FIG. 14B are inserted from upper and lower sides and face each other beside the through hole 41. In the bulk fuel 40 illustrated in FIGS. 21A and 21B, leading ends of the electrode terminals 53 illustrated in FIG. 14D face each other so as to sandwich the through hole 41 from right and left sides. In the bulk fuel 40 illustrated in FIGS. 22A and 22B, leading ends of the electrode terminals 53 illustrated in FIG. 14C face each other so as to sandwich the through hole 41 from right and left sides.

FIGS. 23A to 23D and FIGS. 24A to 24D are explanatory views illustrating operation of an example of the ignition device 30 in which the lead wires are inserted from left and right sides. FIGS. 25A to 25D and FIGS. 26A to 26D are explanatory views illustrating operation of an example of the ignition device 30 in which the lead wires are inserted from upper and lower sides.

Figure 23A:
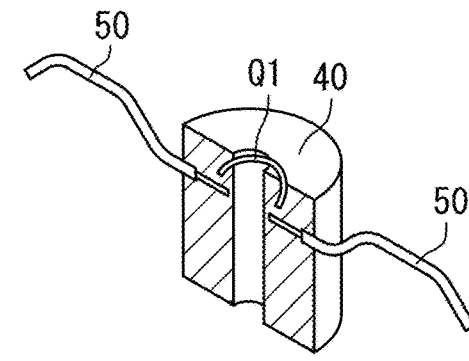
FIGS. 23A to 23D are explanatory views illustrating operation of an example of the ignition device in which the lead wires are inserted from left and right sides.
Figure 23B:
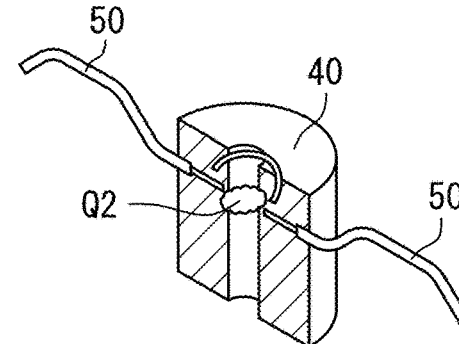
Figure 23C:
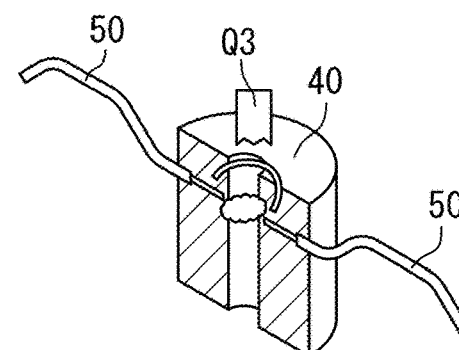
Figure 23D:
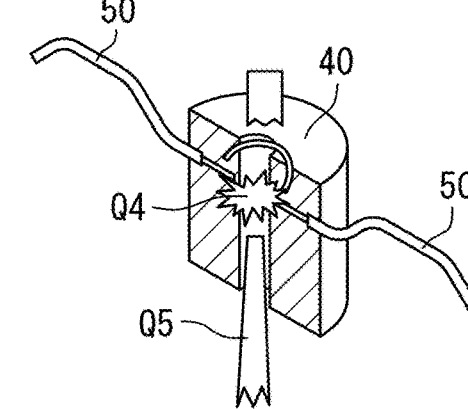
Figure 25A:
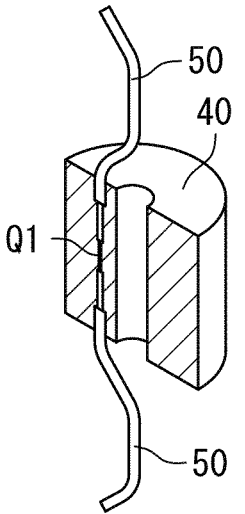
FIGS. 25A to 25D are explanatory views illustrating operation of an example of the ignition device in which the lead wires are inserted from upper and lower sides.
Figure 25B:
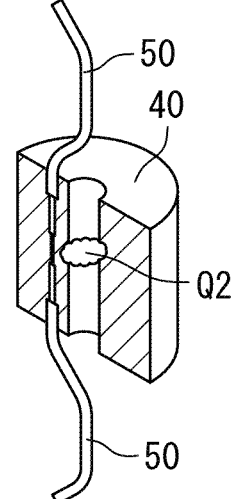
Figure 25C:
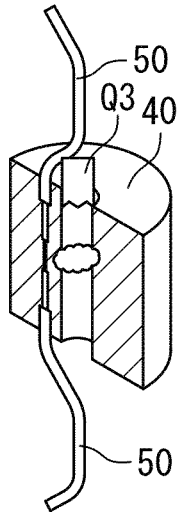
Figure 25D:
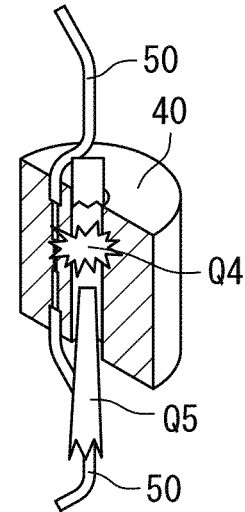

As illustrated in FIGS. 23A and 25A, when an electric power is supplied through the lead wires 50, an energization path Q1 passing through the bulk fuel 40 is created between the leading end of the first lead wire 50 and the leading end of the second lead wire 50. Next, as illustrated in FIGS. 23B and 25B, the bulk fuel 40 is heated and vaporized by energization to generate a gasified fuel Q2 in the through hole 41. Next, as illustrated in FIGS. 23C and 25C, an oxidant Q3 is supplied into the through hole 41. Next, as illustrated in FIGS. 23D and 25D, the gasified fuel Q2 chemically reacts Q4 with the oxidant Q3 to generate a combustion gas Q5. The combustion gas Q5 ignites the main solid fuel 13 of the rocket motor RM. Incidentally, even in a case where the oxidant is supplied before the start of the energization, the bulk fuel 40 can be ignited.

Figure 24A:
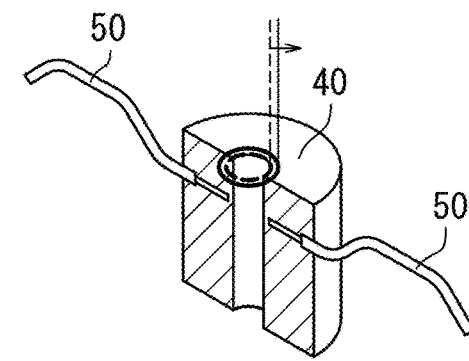
FIGS. 24A to 24D are explanatory views illustrating operation of an example of the ignition device in which the lead wires are inserted from left and right sides.
Figure 24B:
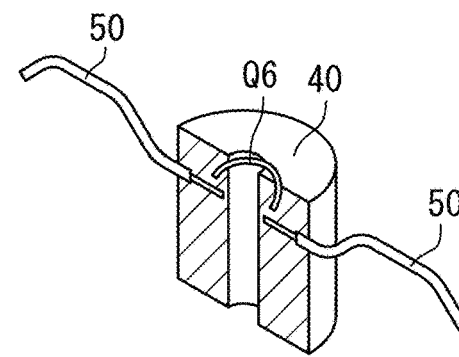
Figure 24C:
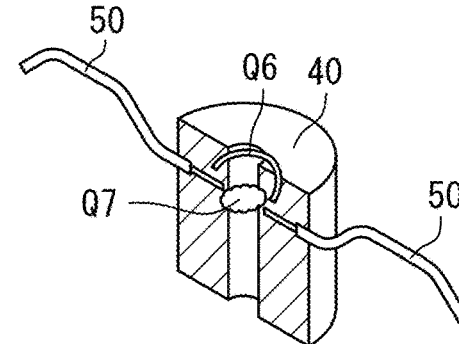
Figure 24D:
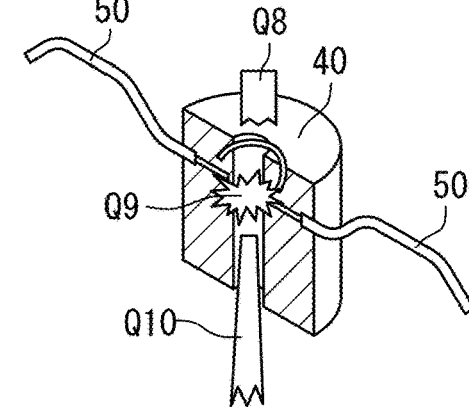
Figure 26A:
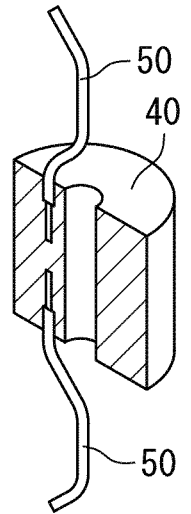
FIGS. 26A to 26D are explanatory views illustrating operation of an example of the ignition device in which the lead wires are inserted from upper and lower sides.
Figure 26B:
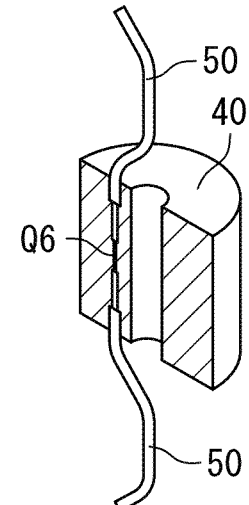
Figure 26C:
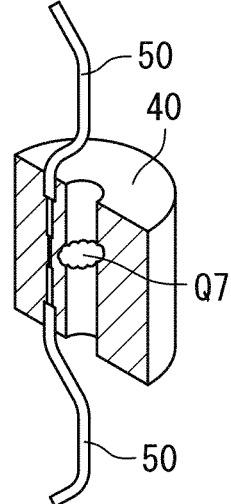
Figure 26D:
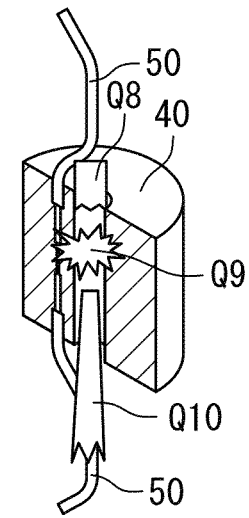

The combustion of the main solid fuel 13 can be stopped by setting a supply amount of the oxidant to zero. As illustrated in FIGS. 24A and 26A, after combustion of the main solid fuel 13, a portion in which gasification has occurred becomes hollow. When re-igniting the main solid fuel 13, the lead wires 50 are energized again, and thereby an energization path Q6 is created between the lead wires 50, as illustrated in FIGS. 24B and 26B. Next, as illustrated in FIGS. 24C and 26C, the bulk fuel 40 is heated and vaporized to generate a gasified fuel Q7 in the through hole 41. Next, as illustrated in FIGS. 24D and 26D, when an oxidant Q8 is supplied into the through hole 41, the gasified fuel Q7 chemically reacts Q9 with the oxidant Q8 to generate a combustion gas Q10. The combustion gas Q10 ignites the main solid fuel 13 of the rocket motor RM again.

Figure 27A:
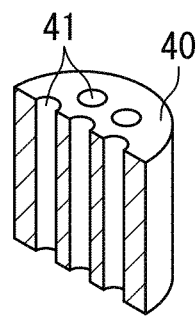
FIG. 27A is a perspective one-side cross section illustrating an example of another shape of the bulk fuel.
Figure 27B:
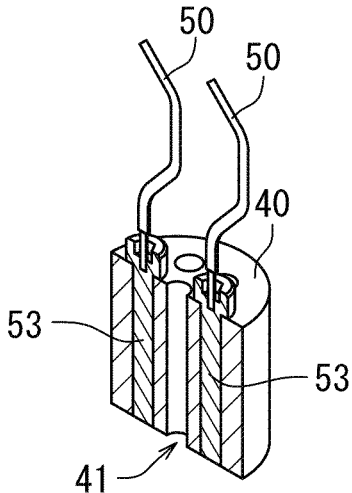
FIG. 27B is a perspective one-side cross-sectional view illustrating an example of a mode in which the lead wires are embedded in the bulk fuel illustrated in FIG. 27A.
Figure 27C:
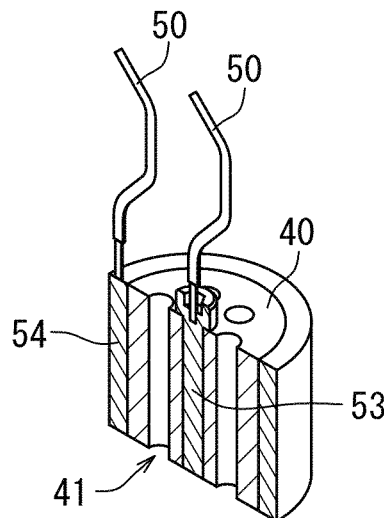
FIG. 27C is a perspective one-side cross-sectional view illustrating another example of a mode in which the lead wires are embedded in the bulk fuel illustrated in FIG. 27A.

FIG. 27A is a perspective one-side cross section illustrating an example of another shape of the bulk fuel 40. FIG. 27B is a perspective one-side cross-sectional view illustrating an example of a mode in which the lead wires 50 are embedded in the bulk fuel 40 illustrated in FIG. 27A. FIG. 27C is a perspective one-side cross-sectional view illustrating another example of a mode in which the lead wires 50 are embedded in the bulk fuel 40 illustrated in FIG. 27A.

The bulk fuel 40 illustrated in FIG. 27A has a columnar outer shape, and has seven through holes 41 in total at the center thereof and at positions away from the center by substantially half the radius. In FIG. 27B, the rod-shaped electrode terminal 53 to which each of the lead wires 50 is connected is inserted into each of two through holes 41 among the seven through holes 41 in total. The two electrode terminals 53 are preferably arranged to face each other so as to sandwich the through hole 41 at the center from left and right sides. This enables uniform energization heating.

In FIG. 27C, the rod-shaped electrode terminal 53 to which the lead wire 50 is connected is inserted into the through hole 41 at the center. A hollow cylindrical electrode terminal 54 to which the lead wire 50 is connected is attached onto a side surface of the bulk fuel 40. Such electrode arrangement allows an electric current to flow along a radial direction of the bulk fuel 40 and enables uniform energization heating.

Figure 28:
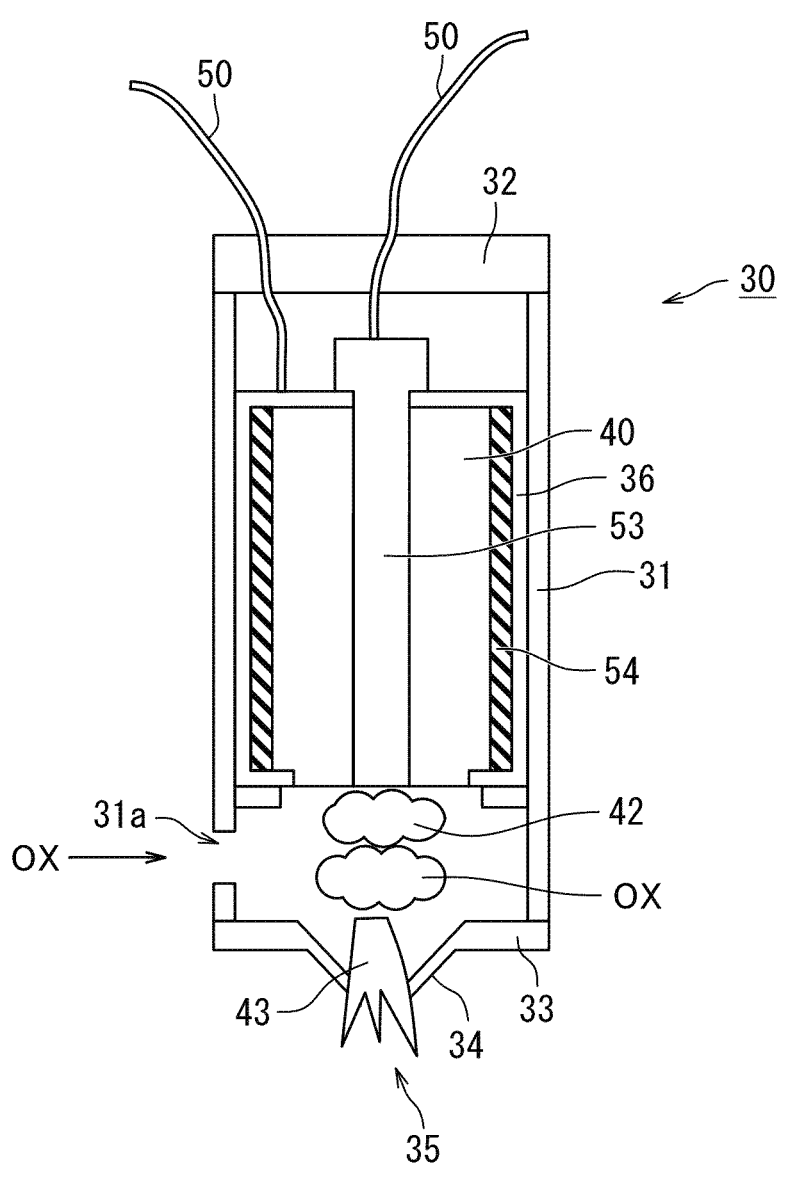
FIG. 28 is a configuration diagram illustrating still another example of the ignition device according to the present invention.

FIG. 28 is a configuration diagram illustrating still another example of the ignition device 30 according to the present invention. The ignition device 30 is similar to the configuration of FIG. 4, but the rod-shaped electrode terminal 53 to which the lead wire 50 is connected is inserted into the through hole 41 at the center. A hollow cylindrical electrode terminal 54 to which the lead wire 50 is connected is attached onto a side surface of the bulk fuel 40. An electrically insulating layer 36 made of synthetic resin or the like is provided between the electrode terminal 54 and the housing 31. The oxidant OX is supplied to the internal space not through the flange 32 but through an input port 31a provided in the side surface of the housing 31.

During operation, when energization between the lead wires 50 is started, an electric current flows between the electrode terminals 53 and 54, and gasification starts from a lower end surface of the bulk fuel 40 to generate the gasified fuel 42. The gasified fuel 42 chemically reacts with the oxidant OX supplied through the input port 31a to generate the combustion gas 43, which is discharged through the outlet 35 to the outside. This can ignite the main solid fuel 13 of the rocket motor RM. As the gasification progresses, the lower end surface of the bulk fuel 40 retreats to an upstream side.

Figure 29A:
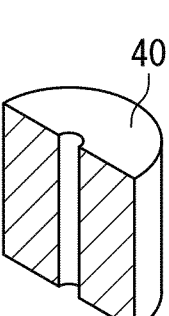
FIG. 29A is a perspective one-side cross section illustrating an example of a shape of the bulk fuel illustrated in FIG.
Figure 29B:
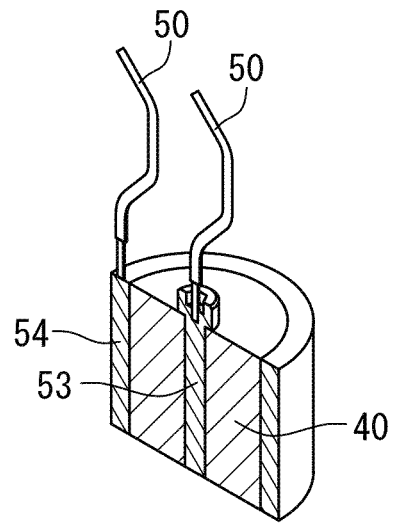
FIG. 29B is a perspective one-side cross-sectional view illustrating an example of a mode in which the lead wires are embedded in the bulk fuel illustrated in FIG. 29A.

FIG. 29A is a perspective one-side cross section illustrating an example of a shape of the bulk fuel 40 illustrated in FIG. 28. FIG. 29B is a perspective one-side cross-sectional view illustrating an example of a mode in which the lead wires 50 are embedded in the bulk fuel 40 illustrated in FIG. 29A. The bulk fuel 40 illustrated in FIG. 29A has a columnar outer shape and has a through hole at a center thereof, and the rod-shaped electrode terminal 53 to which the lead wire 50 is connected is inserted into the through hole. A hollow cylindrical electrode terminal 54 to which the lead wire 50 is connected is attached onto a side surface of the bulk fuel 40.

Figure 30A:
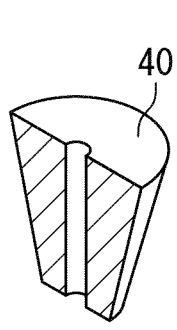
FIG. 30A is a perspective one-side cross section illustrating another example of a shape of the bulk fuel illustrated in FIG. 28.
Figure 30B:
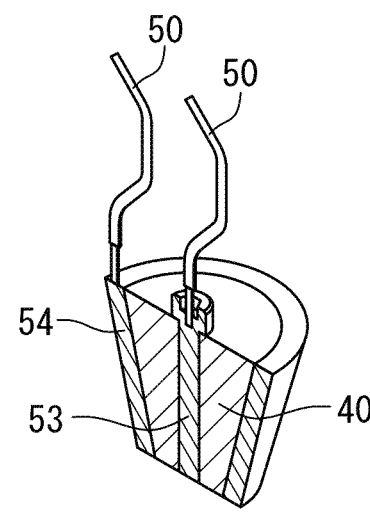
FIG. 30B is a perspective one-side cross-sectional view illustrating an example of a mode in which the lead wires are embedded in the bulk fuel illustrated in FIG. 30A.
Figure 31A:
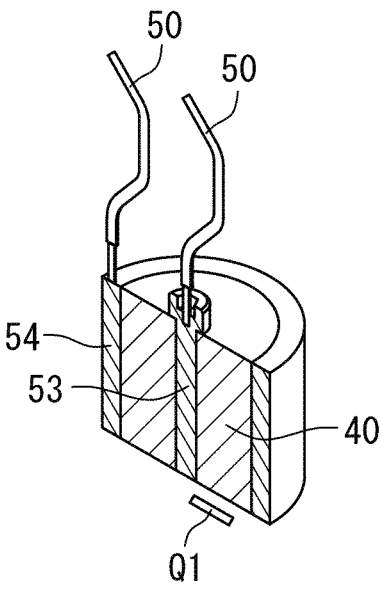
FIGS. 31A to 31D are explanatory views illustrating operation of the example of the ignition device illustrated in FIG. 29B.
Figure 31B:
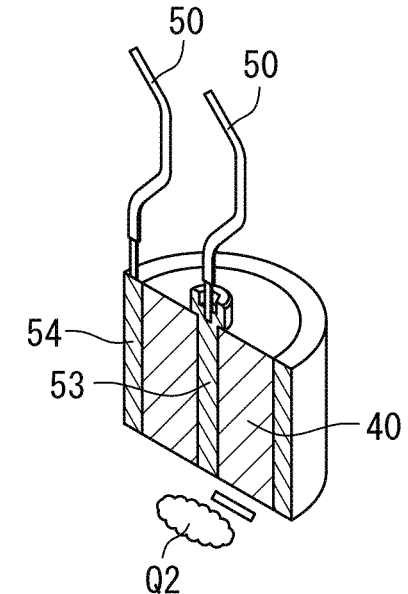
Figure 31C:
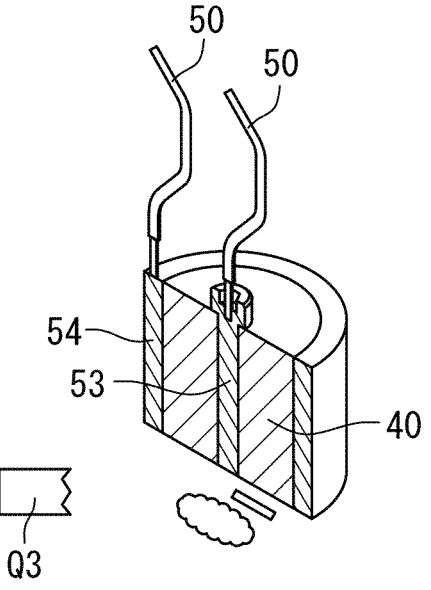
Figure 31D:
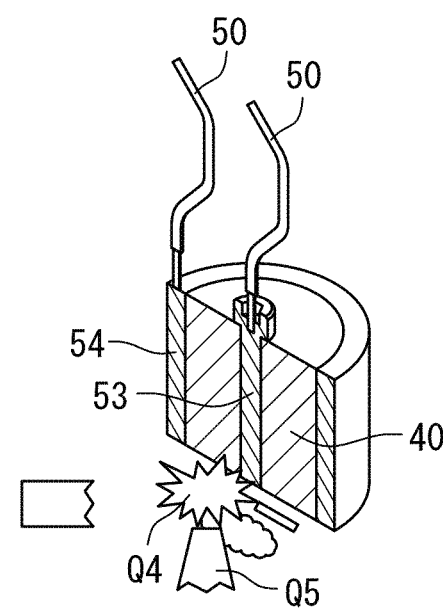
Figure 32A:
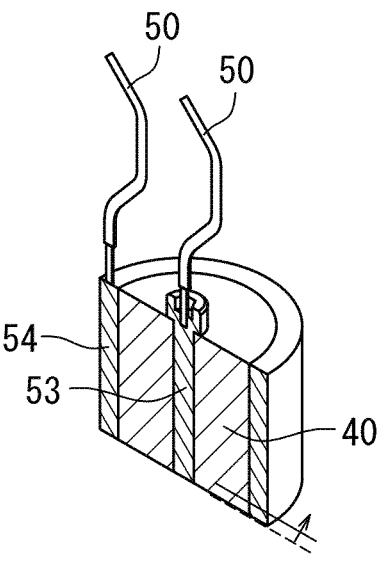
FIGS. 32A to 32D are explanatory views illustrating operation of the example of the ignition device illustrated in FIG. 29B.
Figure 32B:
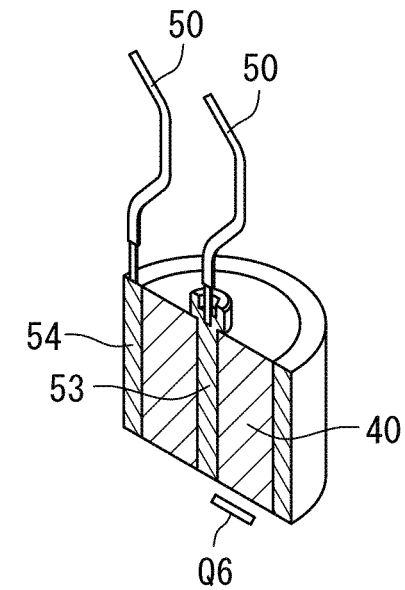
Figure 32C:
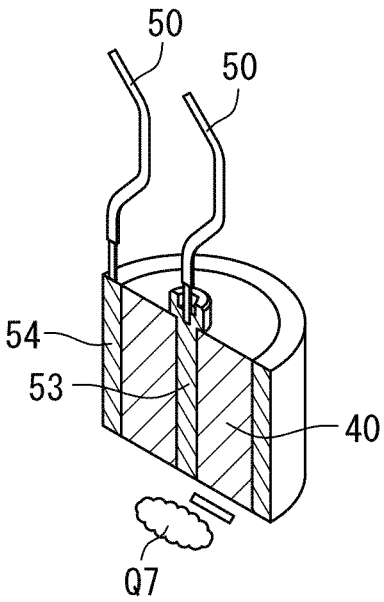
Figure 32D:
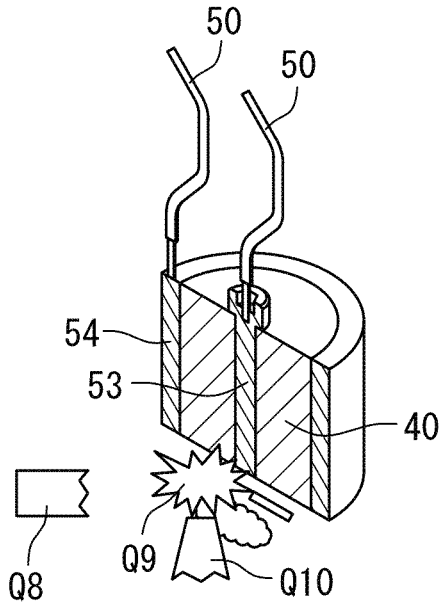
Figure 33A:
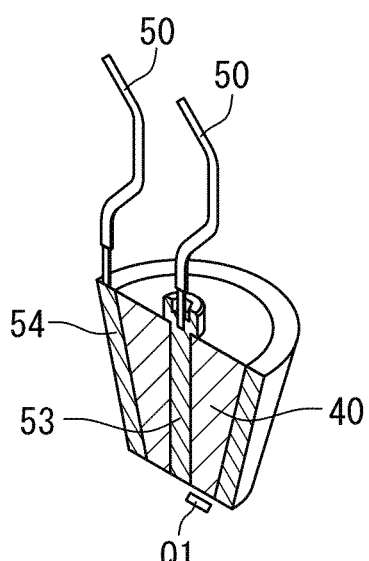
FIGS. 33A to 33D are explanatory views illustrating operation of the example of the ignition device illustrated in FIG. 30B.
Figure 33B:
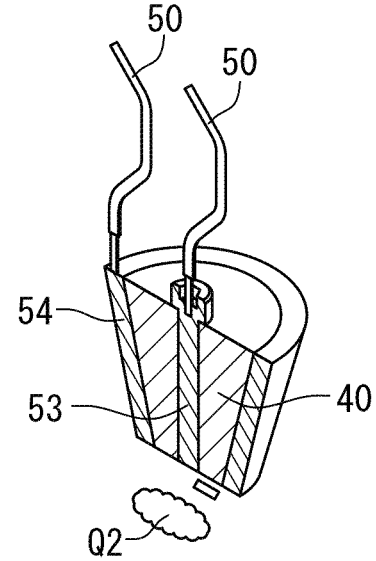
Figure 33C:
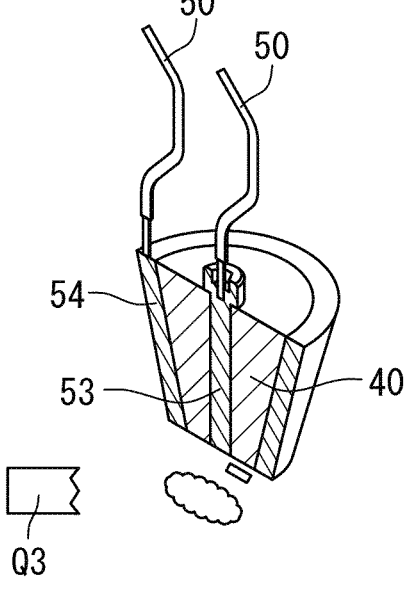
Figure 33D:
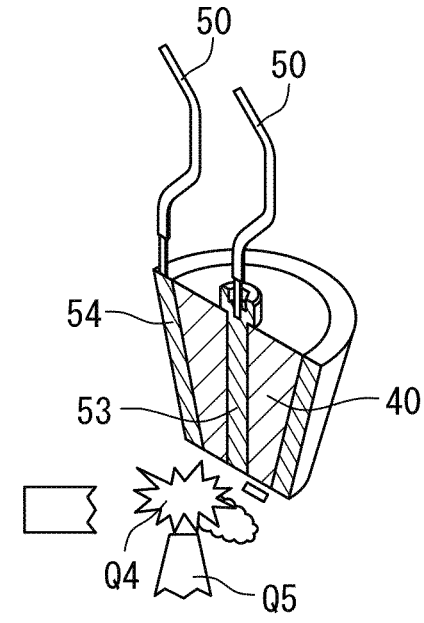
Figure 34A:
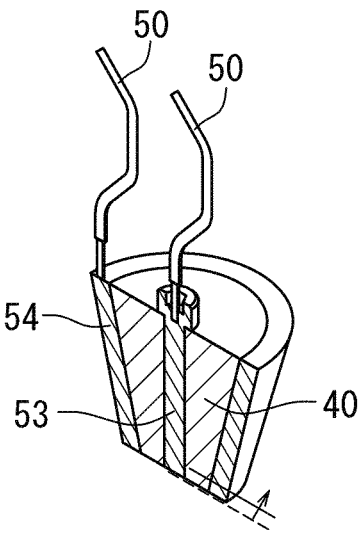
FIGS. 34A to 34D are explanatory views illustrating operation of the example of the ignition device illustrated in FIG. 30B.
Figure 34B:
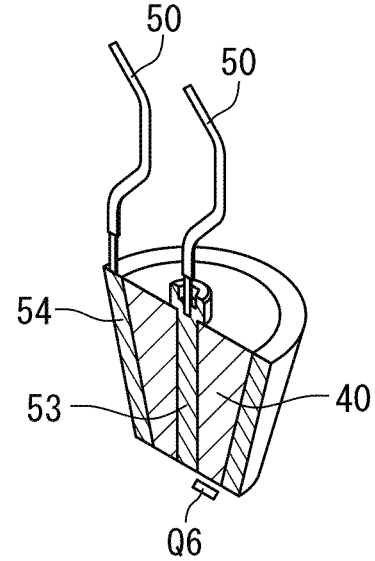
Figure 34C:
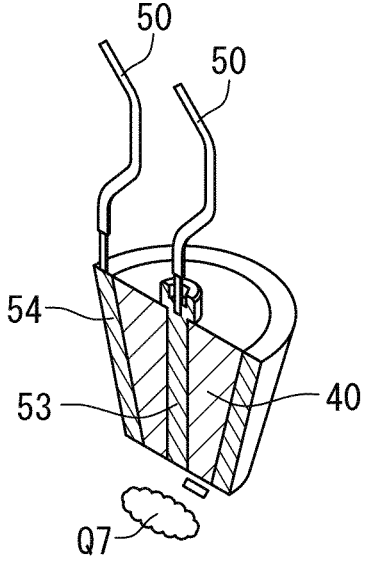
Figure 34D:
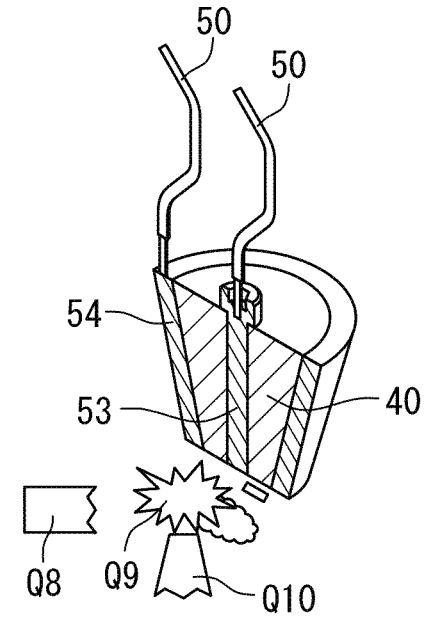

FIG. 30A is a perspective one-side cross section illustrating another example of a shape of the bulk fuel 40 illustrated in FIG. 28. FIG. 30B is a perspective one-side cross-sectional view illustrating an example of a mode in which the lead wires 50 are embedded in the bulk fuel 40 illustrated in FIG. 30A. The bulk fuel 40 illustrated in FIG. 30A has a truncated-cone-shaped outer shape having a lower end surface smaller than an upper end surface and has a through hole at a center thereof, and the rod-shaped electrode terminal 53 to which the lead wire 50 is connected is inserted into the through hole. The tapered hollow cylindrical electrode terminal 54 to which the lead wire 50 is connected is attached onto the side surface of the bulk fuel 40. In this bulk fuel 40, an electric current density during energization is distributed higher at a position closer to the lower end surface as compared with a position close to the upper end surface, and therefore gasification at the lower end surface is performed with certainty.

FIGS. 31A to 31D and FIGS. 32A to 32D are explanatory views illustrating operation of an example of the ignition device illustrated in FIG. 29. FIGS. 33A to 33D and FIGS. 34A to 34D are explanatory views illustrating operation of an example of the ignition device illustrated in FIG. 30. These operations are similar to the operations described with reference to FIGS. 23 to 26, and redundant description will be omitted.

Next, a gasification test of the bulk fuel 40 will be described below. Cylindrical bulk fuel samples (outer diameter d=20 mm, length L=20 mm) shown in Table 1 were produced by using a 3D printer using commercially available conductive filaments (3DFS, Electrically Conductive Composite PLA). Next, a cylindrical bulk fuel sample (outer diameter d=48.4 mm, length L=11.6 mm) shown in Table 2 was produced by mixing ABS powder and carbon black powder. Next, whether or not gasification had occurred and whether or not ignition using an oxidant had occurred were tested by energization of lead wires.

From these test results, it has been found that ignition of bulk fuel occurs upon application of an electric power in a range of 18 [W] to 250 [W] and a voltage in a range of 100 [V] or less of a household power supply.

Next, volume resistivity of the bulk fuel will be described below. Samples were prepared by mixing a plastic material with powder graphite C and then uniformly dispersing it and then molding it into various shapes. Next, volume resistivities of the samples were measured. The results are shown in Table 3. Samples 1 to 7 have a rectangular parallelepiped shape, and Sample 8 has a cylindrical shape. PLA is polylactic acid. PPF is a ready-made product (Proto-Pasta Filament). "Unmeasurable" means that a resistance value is out of a measurement range of a measuring instrument (the resistance value was MΩ or more). Next, Samples were prepared by mixing a plastic material (ABS) with powder carbon black CB and then uniformly dispersing it and then molding it into a filament shape. Next, volume resistivities of the samples were measured. The results are shown in Table 4.

TABLE 3

| Sample No. | Bulk material | Bulk weight (g) | C weight (g) | C content (%) | Volume resistivity [Ω · cm] |
|---|---|---|---|---|---|
| 1 | PLA | 0.142 | 0.142 | 50 | 1471-10023 |
| 2 | PLA | 0.282 | 0.141 | 33 | Unmeasurable |
| 3 | PLA | 0.267 | 0.534 | 67 | 38-421 |

TABLE 1

| Test No. | Fuel dimensions (mm) | Voltage (V) | Current (I) | Power (W) | Preheating (sec) | Oxidant | Results |
|---|---|---|---|---|---|---|---|
| 1 | d = 20 L = 20 | 25 | 1.0 | 25 | None | — | Not gasified |
| 2 | d = 20 L = 20 | 30 | 1.5 | 45 | <1.0 | — | Gasified |
| 3 | d = 20 L = 20 | 40 | 2.0 | 80 | <1.0 | — | Gasified |
| 4 | d = 20 L = 20 | 45 | 2.5 | 112.5 | <1.0 | — | Gasified |
| 5 | d = 20 L = 20 | 50 | 2.8 | 140 | <1.0 | — | Gasified |
| 11 | d = 20 L = 30 | 30 | 0.2 | 6 | None | — | Not gasified |
| 12 | d = 20 L = 30 | 50 | 0.3-1.0 | 15-50 | <1.0 | — | Gasified |
| 13 | d = 20 L = 30 | 80 | 4.0-5.0 | 320-400 | <1.0 | — | Gasified |
| 21 | d = 20 L = 30 | 30 | 0.2 | 6 | None | — | Not gasified |
| 22 | d = 20 L = 30 | 40 | 0.3 | 12 | None | — | Not gasified |
| 23 | d = 20 L = 30 | 50 | 1.4 | 70 | <1.0 | — | Gasified |
| 24 | d = 20 L = 30 | 50 | 3.0 | 150 | <1.0 | $N_2O$ | Ignited |
| 25 | d = 20 L = 30 | 50 | 3 | 150 | <1.0 | $N_2O$ | Ignited |
| 26 | d = 20 L = 30 | 40 | 4 | 160 | <1.0 | $N_2O$ | Ignited |
| 31 | d = 20 L = 20 | 40 | 1.2 | 48 | <1.0 | Air | Gasified |
| 32 | d = 20 L = 20 | 50 | 3.2 | 160 | <1.0 | Air | Gasified |
| 33 | d = 20 L = 20 | 50 | 5.0 | 250 | <1.0 | Air | Ignited |
| 34 | d = 20 L = 20 | 50 | 5.0 | 250 | <1.0 | Air | Ignited |
| 35 | d = 20 L = 20 | 40 | 3.6 | 136 | <1.0 | Air | Ignited |
| 36 | d = 20 L = 20 | 30 | 6.3 | 189 | <1.0 | Air | Ignited |

TABLE 2

| Test No. | Fuel dimensions (mm) | Voltage (V) | Current (I) | Power (W) | Preheating (sec) | Oxidant | Results |
|---|---|---|---|---|---|---|---|
| 41 | d = 48.4 L = 11.6 | 18 | 1 | 18 | <60 | $N_2O$ | Ignited |

TABLE 3-continued

| Sample No. | Bulk material | Bulk weight (g) | C weight (g) | C content (%) | Volume resistivity [Ω · cm] |
|---|---|---|---|---|---|
| 4 | PLA | 0.258 | 0.052 | 17 | Unmeasurable |
| 5 | Epoxy | 0.487 | 0.241 | 33 | Unmeasurable |
| 6 | Epoxy | 0.493 | 0.509 | 51 | Unmeasurable |
| 7 | Epoxy | 0.512 | 1.026 | 67 | 519-11578 |
| 8 | PPF | — | — | — | 422-10895 |

TABLE 4

| Sample No. | Bulk material | Bulk weight (g) | CB weight (g) | C content (%) | Volume resistivity [Ω · cm] |
|---|---|---|---|---|---|
| 11 | ABS | 16.626 | 0.41265 | 2.42 | 76017.63 |
| 12 | ABS | 12.865 | 0.515 | 3.85 | 8926.1 |
| 13 | ABS | 18.261 | 0.913 | 4.76 | 110.05 |
| 14 | ABS | 34.605 | 3.461 | 9.09 | 5.121 |
| 15 | ABS | 32.58 | 4.887 | 13.04 | 1.288 |
| 16 | ABS | 12.892 | 2.581 | 16.68 | 0.763 |
| 17 | ABS | 34.361 | 8.599 | 20 | 0.7721 |

Figure 35:
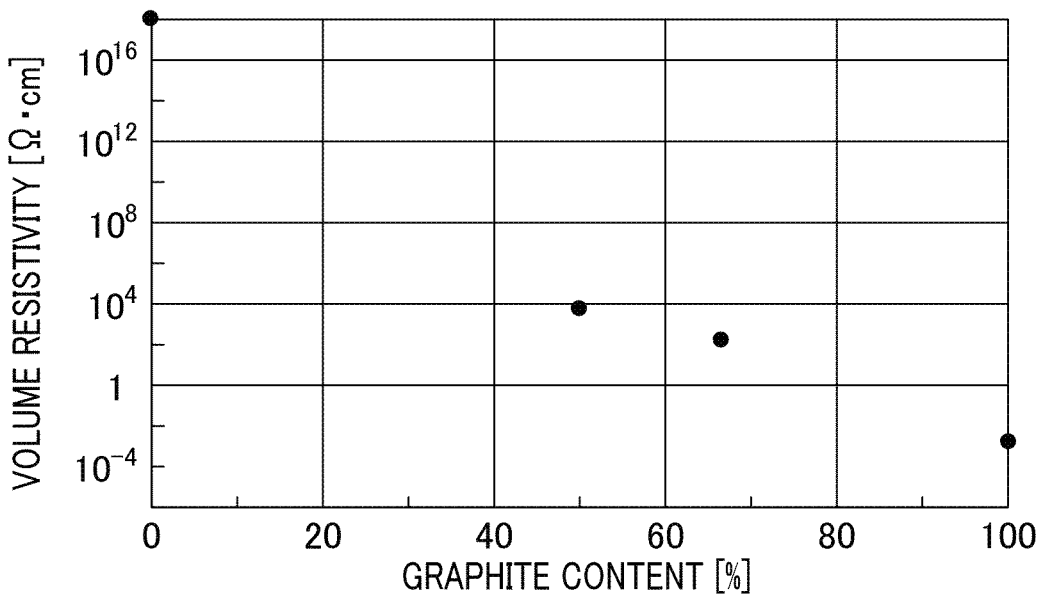
FIG. 35 is a graph showing a relationship between volume resistivity of bulk fuel and graphite content.
Figure 36:
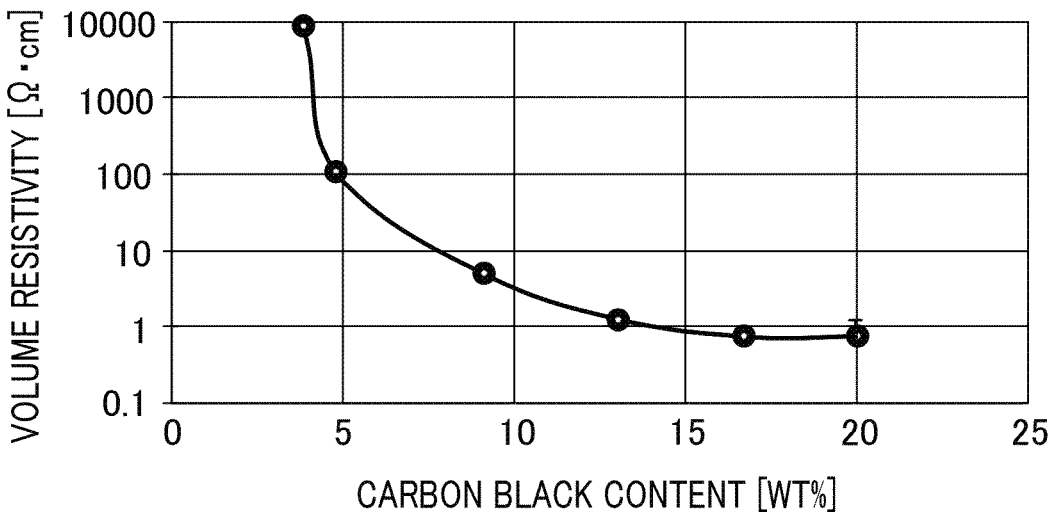
FIG. 36 is a graph showing a relationship between volume resistivity of bulk fuel and carbon black content.

FIG. 35 is a graph showing a relationship between volume resistivity y of bulk fuel and graphite content x. The graph shows that the volume resistivity decreases exponentially as the graphite content increases. As seen from the graph, a range of 0≤x≤about 34% behaves as an electrical insulator, a range of about 65%≤x≤about 100% behaves as a conductive material, and a range of about 34%≤x≤about 65% therebetween is operable as a heater having a suitable electrical resistance value. FIG. 36 is a graph showing a relationship between volume resistivity y of bulk fuel and carbon black content x. Similarly to the graph of FIG. 35, this graph shows that the volume resistivity decreases as the carbon black content increases. The graph shows that when the C content is in the range of 16.68% to 20%, the volume resistivity is substantially flat.

As is understood from the above description, the ignition device according to the present invention has a simple structure and is excellent in re-ignition performance, safety management, thermal management, and reliability. Although application to a hybrid rocket combustion system has been illustrated above, the present invention is also applicable to ignition of liquid fuel of a liquid rocket, solid fuel of a solid rocket, wood, charcoal, solid fuel, combustible gas, tobacco, and the like.

INDUSTRIAL APPLICABILITY

The present invention is industrially very useful in that an ignition device that has a simple structure and is excellent in various kinds of performance can be provided.

The invention claimed is:

1. An ignition device comprising:
a conductive solid fuel as a bulk fuel including:
a plastic material, and
a powdery conductive substance dispersed in the plastic material, the conductive solid fuel being gasified by heating due to energization and ignited by a reaction with an externally supplied oxidant;
at least two electrodes partially embedded in the bulk fuel;
wherein the bulk fuel is gasified by Joule heat that is generated by an electric current passing from one of the at least two electrodes through the bulk fuel including the powdery conductive substance toward another of the at least two electrodes, and
said Joule heat is a heat generation phenomenon caused by formation of a conductive path inside the bulk fuel including the powdery conductive substance due to said energization with a voltage of 100 [V] or less and an electric power of 18 [W] or higher applied between the at least two electrodes.

2. The ignition device according to claim 1, wherein the bulk fuel is made of a material selected from the group consisting of polylactic acid, epoxy resin, polyethylene, polyester, polyurethane, polyacrylonitrile, polymethyl methacrylate, acrylonitrile-butadiene-styrene resin, and polyethylene terephthalate.

3. The ignition device according to claim 1, wherein the conductive substance is made of a material selected from the group consisting of graphite, carbon black, metal, semiconductor, graphene, carbon fiber, and carbon nanotube.

4. The ignition device according to claim 1, wherein the bulk fuel has a prismatic shape or a cylindrical shape, each extending along a longitudinal direction thereof.

5. The ignition device according to claim 1, wherein the bulk fuel has a volume resistivity of 0.763 [Ω·cm] to 10,000,000 [Ω·cm].

6. The ignition device according to claim 1, wherein an electrode terminal having a shape of fork, mesh, rod or hollow cylinder is attached to an leading end of each of the electrodes.

7. An ignition method using the ignition device according to claim 1 including steps of:
gasifying a part of the bulk fuel by using heat generated by energization between the electrodes; and
supplying an oxidant to combust the gasified bulk fuel.

8. A rocket combustion system comprising:
an oxidant line for feeding an oxidant;
a flow rate valve for controlling a flow rate of the oxidant flowing through the oxidant line;
a casing having an internal space to which the oxidant line is connected;
a main fuel stored in the internal space;
a nozzle for discharging a combustion gas generated by a reaction between the main fuel and the oxidant; and
the ignition device according to claim 1, provided between the oxidant line and the internal space to ignite the main fuel.

9. A method for producing an ignition device according to claim 1, including steps of:
softening a conductive solid fuel including a bulk fuel made of a plastic material and a powdery conductive substance dispersed in the bulk fuel, by heating;
press-fitting and partially embedding at least two electrodes into the softened conductive solid fuel; and
fixing the electrodes by curing the conductive solid fuel.

10. A method for producing an ignition device, comprising:
softening a conductive solid fuel including a bulk fuel made of a plastic material and a powdery conductive substance dispersed in the bulk fuel, by heating;
press-fitting and partially embedding at least two electrodes into the softened conductive solid fuel; and
fixing the at least two electrodes by curing the conductive solid fuel.

11. The method according to claim 10, wherein the bulk fuel comprises a material selected from the group consisting of polylactic acid, epoxy resin, polyethylene, polyester, polyurethane, polyacrylonitrile, polymethyl methacrylate, acrylonitrile-butadiene-styrene resin, and polyethylene tere-phthalate.

12. The method according to claim 10, wherein the conductive substance comprises a material selected from the group consisting of graphite, carbon black, metal, semicon-ductor, graphene, carbon fiber, and carbon nanotube.

13. The method according to claim 10, wherein the bulk fuel has a prismatic shape or a cylindrical shape, each extending along a longitudinal direction thereof.

14. The method according to claim 10, wherein the bulk fuel has a volume resistivity of 0.763 [Ω·cm] to 10,000,000 [Ω·cm].

15. The method according to claim 10, wherein the bulk fuel is gasified by Joule heat that is generated by an electric current passing from one of the at least two electrodes through the bulk fuel including the powdery conductive substance toward another of the at least two electrodes, and the Joule heat is a heat generation phenomenon caused by formation of a conductive path inside the bulk fuel including the powdery conductive substance due to energization with a voltage of 100 [V] or less and an electric power of 18 [W] or higher applied between the at least two electrodes.

* * * * *